No. 840,642. PATENTED JAN. 8, 1907.
C. E. MILLER.
MACHINE FOR WRAPPING TIRES.
APPLICATION FILED OCT. 13, 1906.
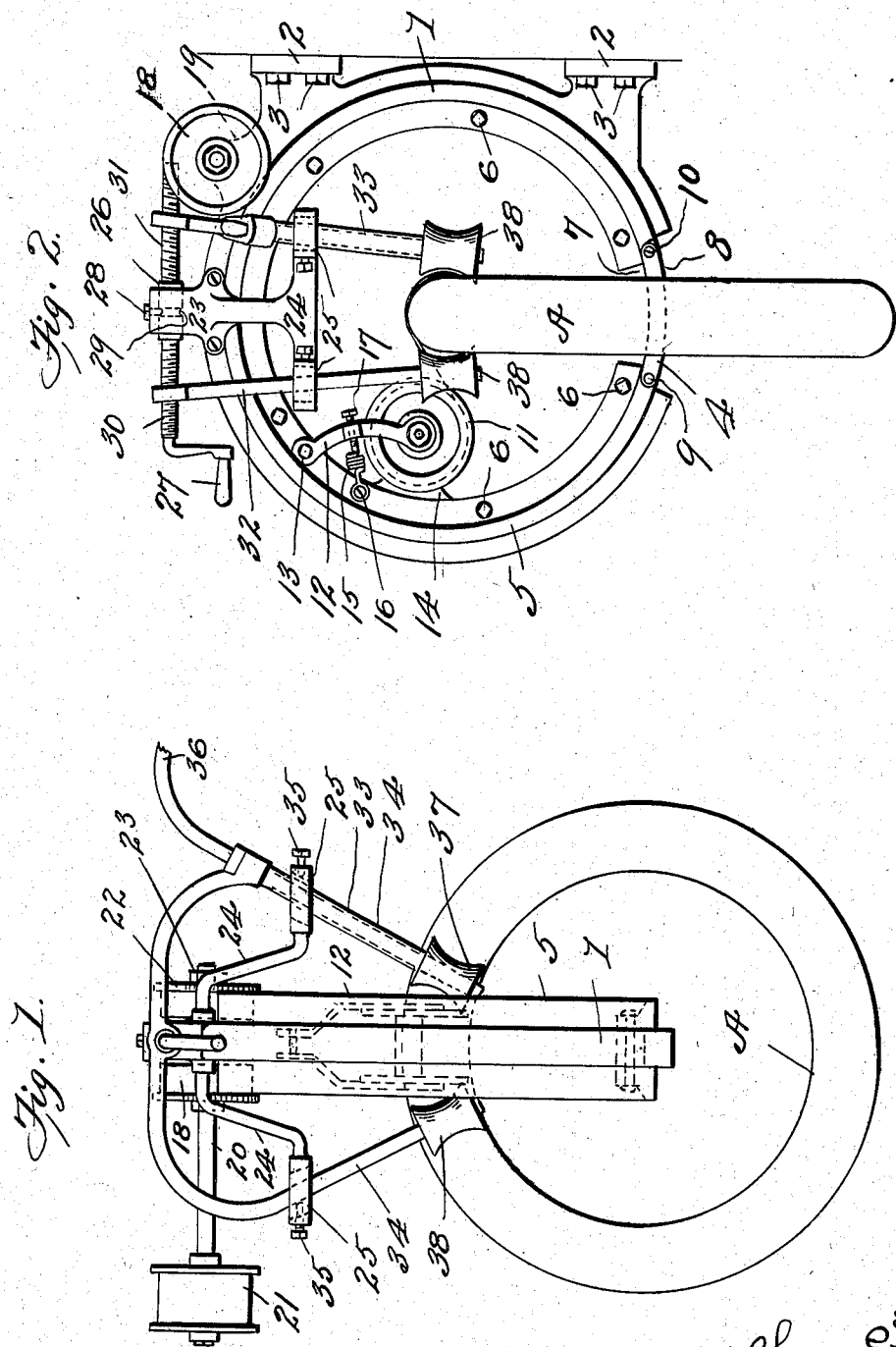
Witnesses
Chas. F. Davies.
John Pierce
Inventor
Charles E. Miller
By Shepherd Parker
Attorneys

UNITED STATES PATENT OFFICE.

CHARLES E. MILLER, OF ANDERSON, INDIANA.

MACHINE FOR WRAPPING TIRES.

No. 840,642.  Specification of Letters Patent.  Patented Jan. 8, 1907.

Application filed October 13, 1906. Serial No. 338,770.

*To all whom it may concern:*

Be it known that I, CHARLES E. MILLER, a citizen of the United States, residing at Anderson, in the county of Madison and State of Indiana, have invented certain new and useful Improvements in Machines for Wrapping Tires, of which the following is a specification.

This invention relates to new and useful improvements in machines for wrapping tires, and it particularly pertains to a machine adapted for heavy work, such as automobile-tires.

In the art as is ordinarily practiced when a tire is first made or is repaired it is necessary to wrap strips of fabric about three inches wide tightly around the tire in order to hold the new rubber in place when it is being vulcanized. It is a desideratum that the tire should be wrapped very tightly, since the extreme pressure forces the new rubber into the cloth and causes it to adhere better than when the tire is wrapped loosely. To attain a tight wrapping for the purpose above described, it has been necessary heretofore to wrap the tire by hand, thereby increasing the expense of manufacture through a laborious and tedious operation, which oftentimes fails of satisfactory results.

It is therefore a primary object of the present invention to provide a machine which shall automatically accomplish a tight wrapping, such as has been heretofore done by hand.

It is a further object of the invention to provide means for adjusting the tension of the fabric as it is wound upon the tire.

The invention also aims to provide means for feeding the tire in a circular path about its center and to provide feeding means adapted for tires of varying sizes.

The invention finally aims to provide a device which shall be simple in construction, inexpensive to manufacture, and practical and efficient in use.

The detailed construction will appear in the course of the following description, in which reference is had to the accompanying drawings, forming a part of this specification, like characters designating like parts throughout the several views, wherein—

Figure 1 is a plan view of a tire-wrapping apparatus constructed in accordance with my invention, and Fig. 2 is a side elevation thereof.

In the practical embodiment of my invention I employ a supporting-frame 1, provided with rearwardly-extending brackets or shoes 2, through which pass fastening means 3, such as bolts, for securing the frame 1 to a stationary object. The frame 1 is of annular outlines and in its extreme lower portion has material cut away therefrom, as at 4, to provide an open space through which the tire A to be wrapped is introduced. A rotating frame 5 is mounted concentrically within the frame 1 and preferably comprises two L-bars of annular outlines secured to one another by bolts or rivets 6, passing through their vertical legs. The frame 5 is likewise cut away, as at 7, so that in one position thereof the open space 7 shall register with the open space 4. After the tire has been introduced through the spaces 7 and 4 in their registering relation the space 7 is closed by an arcuate link 8, pivoted, as at 9, to one end of the frame 5 and held in position by a suitable fastening device 10, as is shown in Fig. 2.

The tire-wrapping means is carried by the frame 5 and comprises a spool 11, upon which the fabric (indicated by dotted lines in Fig. 2) is wound. The spool 11 is rotatably supported between arms 12, pivoted at 13 to the central portion of the frame 5. A stationary brake-block 14 is mounted upon said frame adjacent said spool and is designed to prevent the same from unwinding too freely. The brake-block 14 may either bear upon the spool itself or upon the fabric, as it is desired. The arms 12 are normally drawn toward the block 14 by retractile coil-springs 15, secured to the frame 5, as at 16, and having their free ends threaded through the arms 12 and provided with an adjusting-nut 17. The nut 17 affords a means for tensioning the springs 15 and regulating the degree of pressure or tightness of the fabric upon the tire during the winding operation. The frame 5 is rotated by means of frictional gears 18, journaled in offset bearings 19, provided upon the frame 1. The gears 18 are mounted upon a shaft 20, which carries a power-pulley 21. It is preferred that means be provided for centering the frame 5 with relation to the frame 1, and an advantageous embodiment is shown in Figs. 1 and 2 comprising peripheral flanges 22, carried by the gears 18 and overlying the sides of the frame 5.

The tire-feeding means is mounted upon the frame 1 and comprises a supporting-bracket 23, provided on each side thereof with angular-extending depending arms 24, provided at their lower ends with spaced collars 25, arranged on each side of the frames 1 and 5. A shaft 26, provided with an operating-handle 27, is journaled in the bracket 23 longitudinally of the frame 1, the shaft 26 being detachably held in position by a screw 28, threaded through said bracket and engaging in an annular groove 29, provided upon said shaft. The shaft 26 is threaded, as at 30 and 31, in opposite directions on each side of the bracket 23, the threads 30 and 31 passing through openings provided for said shaft in pulley-supports 32 and 33. The supports 32 and 33 are formed with depending converging arms 34, which pass through the respective collars 25 and are held therein by set-screws 35, which serve as a pivot. One of the arms 34, which, as shown, is upon the support 33, is hollow for the reception therethrough of a universal operating-shaft 36, which at its end carries the main feed-roller 37. Idle feed-rollers 38 are provided upon the ends of the remaining arms 34. The rollers 38 are concaved, so as to conform to the curvature of the side of the tire A, the said tire being held between said arms in pairs, as is clearly illustrated. In order to accommodate tires of different sizes, the shaft 26 is rotated in the proper direction to simultaneously separate or bring together the lower ends of the arms 34, which carry the feed-rollers.

The operation will be readily apparent from the foregoing description. The tire is introduced between the spaces 7 and 4, as above intimated, and is held between the rollers 37 and 38, the supports 32 and 33 having been adjusted, as described. The frame 5 is then rotated by the gears 18, the spool 11 moving therewith in a circular path of travel, the fabric automatically unwinding itself from said spool upon the tire as the latter is fed proportionately by the means described.

While the elements herein shown and described are well adapted to serve the functions set forth, it is obvious that various minor changes may be made in the proportions, shape, and arrangement of the several parts without departing from the spirit and scope of the invention as defined in the appended claims.

Having fully described my invention, what I claim is—

1. A machine of the type set forth comprising an annular supporting-frame, an annular frame rotatably inclosed therein, supporting-arms carried by said last-named frame and pivoted thereto and a spool mounted between said arms.

2. A machine of the type set forth comprising an annular supporting-frame, an annular frame rotatably inclosed therein, a spool yieldably mounted upon said second frame and a brake-block bearing against said spool.

3. A machine of the type set forth comprising in combination with means for winding fabric about a tire, of tire-supporting means comprising a stationary support, opposed pulleys suspended therefrom on depending pivoted shafts and means for adjustably moving said shafts in either direction upon their respective pivots.

4. A machine of the type set forth comprising a supporting-annulus, an annulus rotatably mounted therein, means carried by said supporting-annulus for suspending a tire, means carried by said last-named annulus for wrapping a tire, and means on said supporting-annulus for rotating said last-named annulus.

In testimony whereof I affix my signature in presence of two witnesses.

CHARLES E. MILLER.

Witnesses:
M. G. REYNOLDS,
BELLE KUNTZ.